(12) United States Patent
Cocks

(10) Patent No.: US 6,731,755 B1
(45) Date of Patent: May 4, 2004

(54) SPLIT-KEY CRYPTOGRAPHIC SYSTEM AND METHOD

(75) Inventor: Clifford C Cocks, Cheltenham (GB)

(73) Assignee: The Director, Government Communications Headquarters, Cheltenham (GB)

( * ) Notice: Subject to any disclaimer, the term of this patent is extended or adjusted under 35 U.S.C. 154(b) by 0 days.

(21) Appl. No.: 09/446,827

(22) PCT Filed: Jul. 13, 1998

(86) PCT No.: PCT/GB98/02055

§ 371 (c)(1),
(2), (4) Date: Dec. 29, 1999

(87) PCT Pub. No.: WO99/05818

PCT Pub. Date: Feb. 4, 1999

(30) Foreign Application Priority Data

Jul. 28, 1997 (GB) .............................................. 9715761
Nov. 28, 1997 (GB) .............................................. 9725190

(51) Int. Cl.[7] .............................. H04K 1/00; H04L 9/00
(52) U.S. Cl. ......................... 380/30; 380/277; 380/278; 380/282; 380/283
(58) Field of Search ................................ 380/277, 278, 380/30

(56) References Cited

U.S. PATENT DOCUMENTS 5,588,061 A * 12/1996 Ganesan et al. .............. 380/30

OTHER PUBLICATIONS

Cocks, "Split knowledge generation of RSA parameters", *Cryptography and Coding. 6th IMA International Conference. Proceedings, Proceedings of Cryptography, Cirencester, UK*, Dec. 17–19, 1997, pp. 89–95.

* cited by examiner

*Primary Examiner*—Ayaz Sheikh
*Assistant Examiner*—Michael Vaughan
(74) *Attorney, Agent, or Firm*—Nixon & Vanderhye P.C.

(57) ABSTRACT

A method of operating a split-key cryptographic system having two or more co-operating microprocessors, i, linked via a communications channel, involving the generation of a public modulus, N, being the multiple of two integers, P,Q, where $P=p_1+p_2 \ldots p_n$ and $Q=q_1+q_2 \ldots p_n$ in such a way that none of the microprocessors; individually has the ability to decrypt encrypted data. Microprocessor i selects a temporary public modulus and the integers $p_i$, $q_i$, a function of which is transmitted to the other microprocessors, j. Every microprocessor j uses the function to generate a set of numbers which are dependent on integers $p_j$, $q_j$, which are secret to each microprocessor j. Each Microprocessor i then uses these numbers to co-operate to generate the public modulus N. N is thus generated without any party having full knowledge of the integers P and Q.

9 Claims, 4 Drawing Sheets

SPLIT-KEY CRYPTOGRAPHIC SYSTEM AND METHOD

This application is the U.S. national phase of International Application No. PCT/GB98/02055, filed Jul. 13, 1998, which designated the U.S., the entire content of which is hereby incorporated by reference.

The present invention relates to asymmetric key-code cryptographic communications systems and methods and in particular to systems and methods involving the co-operative generation of public parameters in such a way that co-operative decryption is required.

With the increase in accessibility to microprocessors, for example in the form of programmable computers or dedicated microprocessors, the transfer of information between microprocessors, over a communications channel, has rapidly increased. There are many applications, for example electronic banking, e-mail systems and subscriber information systems, where it is preferable to encrypt any information which will pass over the communications channel in order to prevent its disclosure to unauthorised recipients.

To implement cryptographic functions in a microprocessor controlled communications system symmetrical or asymmetrical algorithms may be used. Functions based on asymmetrical algorithms are particularly useful since a user, for example a first microprocessor, can generate and make universally available a single "public" encryption key to anyone, for example a second microprocessor, wishing to send the user a message. The user can then retain a "private", different decryption key which is related in some way to the public key. One such asymmetrical algorithm that is used in cryptographic communications systems is the well known RSA algorithm (U.S. Pat. No. 4,405,829).

The parameters for the well known RSA system consist of a public modulus N which is a product of two primes; P, Q, a public encryption key e; and a secret decryption key d. The factorisation of N is a secret parameter and the keys are related by a formula of the form $de=1 \mod \phi(N)$, where $\phi(N)$ is the order of the multiplicative group of integers modulo N. Then with knowledge of only the public parameters, any message (so called "plaintext" message), x (represented as a positive integer less than N), can be enciphered using a formula of the form $y=x^e \mod N$. The secret parameter d is needed to decipher the encrypted message (so called "ciphertext" message), y, via a formula of the form $x=y^d \mod N$.

Thus, in the known asymmetrical cryptographic systems the user is in possession of the only decryption key and can act autonomously to decrypt any message. This may be a problem, for example in circumstances where a central authority regulates, generates and issues public and private keys then this central authority has the capability to masquerade as any user-microprocessor and decrypt private messages.

A cryptographic method involving a split-key decryption scheme is described by Boneh and Franklin (Efficient Generation of Shared RSA Keys, to be presented at CRYPTO '97, University of California Aug. 17–21, 1997, published by Springer Verlag and currently available at the web site location http://www.cs.princeton.edu/~dabo/publications.html—Lecture Notes in Computer Science vol 1294). However this describes a scheme involving three entities in generating the split-key, any two of which can co-operate to decrypt a message without recourse to the third.

It is the object of the present invention to provide a cryptographic communications system and a cryptographic method for use in such a system that requires the co-operative effort of only two entities but which can be expanded for application by a plurality of entities all of whom must co-operate. The entities will co-operate in a manner according to the claimed invention to generate the public parameter N in such a way that no individual entity knows the factorisation of N, and such that they can each have a share $d_1, d_2, \ldots d_n$ respectively of the secret decryption key d where $d=(d_1+d_2+ \ldots d_n)+c$, where c lies between 0 and n−1. Hence no entity will individually possess the ability to recover the plaintext message x from a ciphertext message y. Instead, all the entities must co-operate in a manner according to the claimed invention in order to decrypt the message or to generate verification data for a further entity as part of an identification and signature scheme.

This object is achieved by using the method having the features of independent claim 1 and also by using the system having the features of claim 5. In using this method and system two or more entities, having microprocessors A, B, . . . n must co-operate to generate the RSA public parameter N. Once N is determined in this way the entities can then co-operate to generate and use decryption keys to produce a decrypted output in ways dependent on the application of the communications system.

Further useful embodiments of the invention are provided for in the sub-claims.

Usefully, claim 3 provides a method of generating a high security public modulus N provided that the level of confidence that P and Q are prime is set to a sufficiently high level using primality testing algorithms well known in the art.

Particularly, claim 4 provides a method of operating a cryptographic communications system in which the entities 1, 2 . . . n must co-operate to decrypt a ciphertext message which was encrypted using the RSA type algorithm.

Methods and a system according to the present invention are described below in more detail and with reference to the drawings of which:

EXAMPLE 1

Figure 2:
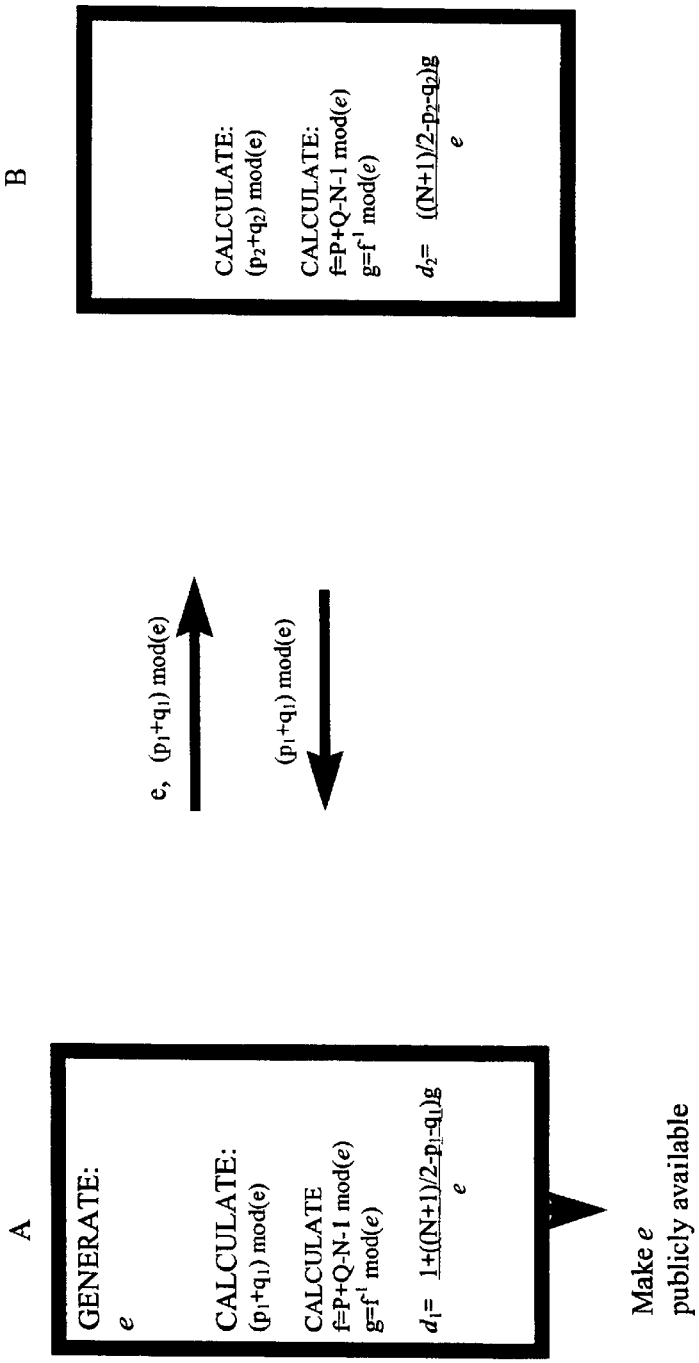
FIG. 2 shows the sequence, in principle, of operating a cryptographic system according to the present invention to generate the RSA secret parameters.
Figure 3:
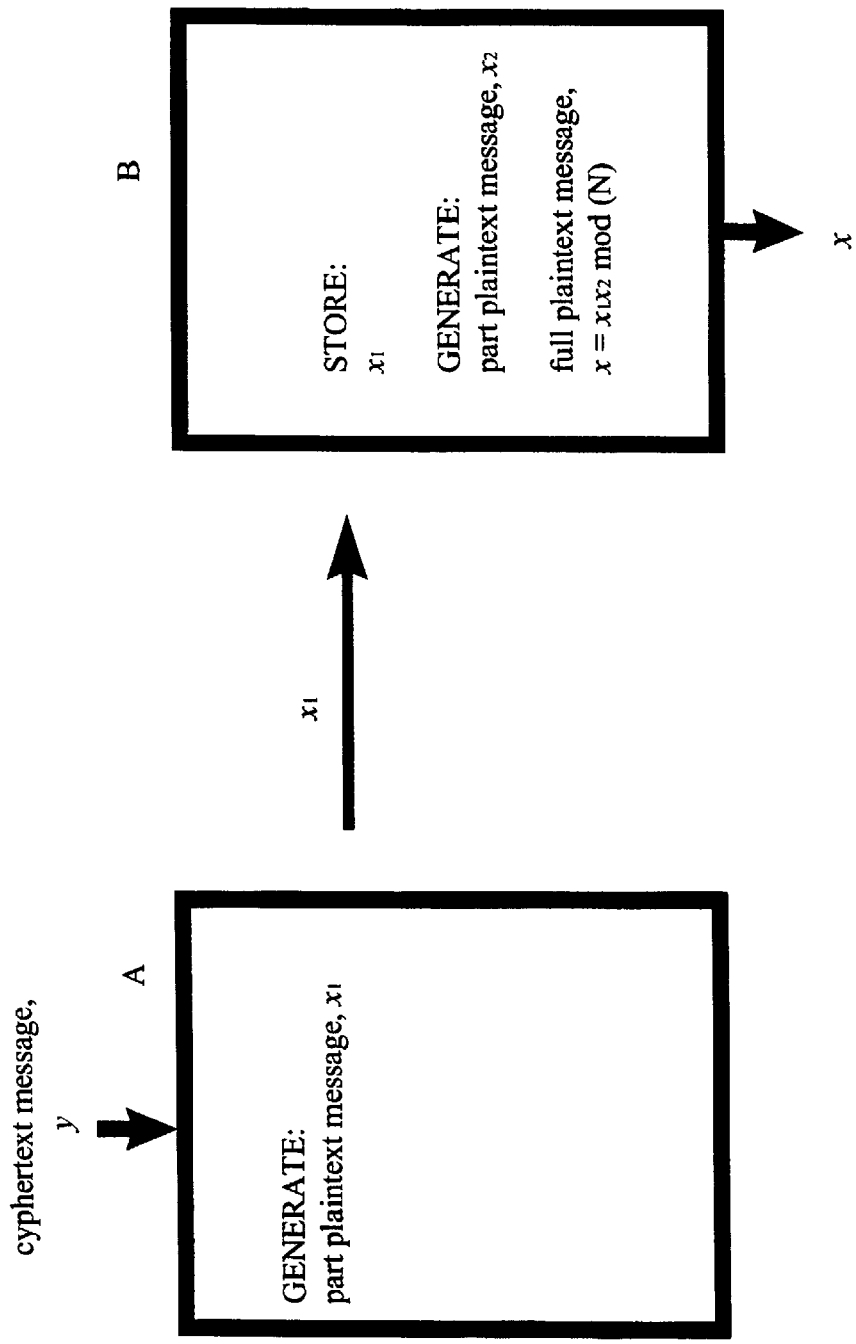
FIG. 3 shows the sequence, in principle, of operating an RSA cryptographic system according to the present invention to decrypt an RSA cyphertext message.

An example is described below with reference to FIGS. 1 to 3 in which the method according to the present invention is used in a cryptographic system in which aplaintext message is converted to a cyphertext message which is then transmitted to co-operative computers which must act in concert to reproduce the plaintext message. This consists in essence of three parts as presented in FIGS. 1, 2 and 3. These parts comprise:

a. A procedure to enable two entities, which may be for example suitably programmed computers or dedicated-microprocessors linked via a communications channel, to generate a public RSA modulus, N, that is (to a high probability) the product of two primes P and Q, such that neither entity can recover P or Q with a feasible amount of work; (FIG. 1)

b. A procedure for the two entities to generate their shares $d_1$ and $d_2$ of the secret RSA key d, given a public encryption key e; (FIG. 2) and c. A procedure to allow co-operative recovery of a ciphertext message, encrypted from a plaintext message using the RSA algorithm with the public parameters N and e. (FIG. 3)

<u>a</u>. To begin with A selects its own RSA modulus M and public key e(M), either by user input or by a suitably coded algorithm. These two numbers are transmitted to B. A's secret decryption key will be d(M). The value of M must be at least as big as that of the largest size of the public modulus N which they will generate. Then A transmits to B the quantities $p_1^{e(M)}$ mod M and $q_1^{e(M)}$ mod M.

B now calculates the three numbers $(p_1 q_2)^{e(M)}$ mod M, $(p_2 q_1)^{e(M)}$ mod M and $(p_2 q_2)^{e(M)}$ mod M. These three quantities will be referred to as $z_1$, $z_2$ and $z_3$ respectively. B also generates a set of numbers $b_{i,j}$ for i=1, 2, 3 and j=1, 2, ..., K. The preferred value of K will be discussed later. The $b_{i,j}$ are selected to be random modulo M, subject to the constraints: $\Sigma_j b_{1,j} = \Sigma_j b_{2,j} = \Sigma_j b_{3,j} = 1$.

B then generates the set of numbers $x_{i,j} = z_i b_{i,j}^{e(M)}$ mod M and transmits these to A but in a new order. The ordering must be such that it is computationally unfeasible to recover the values of i and j from the set $x_{i,j}$ as sent. Thus a random order, or a sorted order are both acceptable.

A now calculates $y_{i,j} = x_{i,j}^{d(M)}$ mod M. Thus $y_{i,j} = b_{i,j} z_i^{d(M)}$ mod M, and hence A can determine $N = (p_1+p_2)(q_1+q_2) = p_1 q_1 + \Sigma_{i,j} y_{i,j}$ mod M, which is transmitted to B.

As it stands A could substitute any N of its choice at this point (although if done, it is not clear that A will be able to complete the later steps of the method in a satisfactory fashion). Nevertheless, this can be prevented by making the above procedure symmetrical. To do this B produces its own modulus and executes the above exchange using the same values of $p_1$, $p_2$, $q_1$ and $q_2$, and for this exchange it will be A which is programmed to produce the set of random values. Then A and B will both know N. A so called "hash" of N may then be exchanged between A and B in order to confirm that they have recovered the same value.

There is no guarantee that the public modulus, N, generated in this way is of a form suitable for use as an RSA modulus. Therefore N must be tested and the above procedure repeated until an N suitable for use as an RSA modulus. A suitable algorithm to test for N being of the right form is therefore needed. One such algorithm is to test for the condition that $x^{N+1} = x^{P+Q}$ mod N for many x. (In practice almost all N not of the correct form will fail on the first x tested.) This condition does not guarantee that P and Q are prime, for example either of them could be Carmichael numbers. However, even if they are not prime we can use the N as an RSA modulus, but being a product of more than two primes may make such N easier to factorise and hence make the system less secure.

Now, to test whether N is of the right form using the above algorithm, A and B will be programmed to employ an identical set of x. A is programmed to calculate $x^{N+1-p_1-q_1}$ mod N and B to calculate $x^{p_2+q_2}$ mod N. A hash (using a secure hash function) of these values is then exchanged between the computers A and B which will be sufficient to tell if they are equal.

Once an N has been found that passes the above test it is possible to use the test of Boneh and Franklin to increase confidence in the fact that P and Q are both prime, so that N can be used as a "high security" RSA modulus with greater confidence. To make use of this Boneh and Franklin test it is necessary that $P \equiv 3$ (mod 4) and $Q \equiv 3$ (mod 4). This can be achieved by having A and B control the values of $p_1$, $p_2$, $q_1$ and $q_2$ modulo 4. The test, described below, is executed k times, where k is set according to the level of confidence required. A number N of the correct form will always pass the test, whilst if either P or Q is composite the test will fail with a probability of at least ½ at each of the k iterations.

Each iteration comprises two parts. In the first part A and B use a common random integer x in the range 1 to N−1 such that the Jacobi symbol (x/N) equals +1. A is programmed to calculate a hash of each of the two values $\pm x^{(N+1+1-p_1-q_1)/4}$ mod(N). The other entity, B is programmed to calculate a hash of $x^{(1+p_2+q_2)/4}$ mod(N), where 1=0, 1, 2 or 3 according to the values of $p_1$, $p_2$, $q_1$ and $q_2$ modulo 4. The hashed values are compared and the test is failed if they do not match and the second part need not be undertaken.

In the second part A and B use the same two randomly chosen co-prime integers in the range 1 to N−1, u and v say. Working in a ring of polynomials $Z_N[X]$ A computes the remainder when $(uX+v)^{N+1+p_1+q_1}$ is divided by $X^2+1$ and B computes the remainder when (uX+v) is divided by $X^2+1$. Writing these polynomials as $u_1 X + v_1$ and $u_2 X + v_2$ respectively, A calculates a hash of $v_1/u_1$ mod(N) and B calculates a hash of $-v_2/u_2$ mod(N). The hashed values are compared and the test fails if the two values differ.

<u>b</u>. Once an acceptable modulus has been found, the next step is to generate the public encryption key, e and the secret decryption key d. This is done in such a way that d is held by the co-operating computers A and B in two parts $d_1$ and $d_2$, where $d = d_1 + d_2$. The algorithm employed to generate these parameters is as follows:

Firstly, the public key e is determined and shared between A and B. Preferably, this should be chosen so that P−1 and Q−1 are likely to be co-prime to e, but at the same time e should not be too large as A and B will have to share $(p_1+q_1)$ mod e and $(p_2+q_2)$ mod e with each other. A value such as $e = 2^{16}+1$ should be satisfactory.

Now A transmits $(p_1+q_1)$ mod e to B and B transmits $(p_2+q_2)$ mod e to A, so they can both calculate $f = P+Q-N-1$ (mod e). If f is non zero and co-prime to e then they can both calculate $g = f^{-1}$ (mod e). The secret decryption key will be:

$$d = (1 + (N+1-P-Q)g)/e; \text{ but } A \text{ will calculate:}$$

$$d_1 = \frac{1 + ((N+1)/2 - p_1 - q_1)g}{e};$$

and
B will calculate:

$$d_2 = \frac{((N+1)/2 - p_2 - q_2)g}{e}$$

A person skilled in the art can easily verify that $d = d_1 + d_2$. Such a skilled person would also appreciate that in the alternative $d_1$ may be rounded up and $d_2$ rounded down.

<u>c</u>. In order to decrypt an RSA encrypted plain text message, x, the cyphertext message $y = x^e$ mod N, A and B must be programmed to act in co-operation. One way this may be achieved is to have A receive the cypher text message and decrypt it partly using the RSA algorithm to produce a "part" plaintext message $x_1 = y^{d_1}$ mod N which is transmitted to B which stores it in a computer memory location. B is programmed to receive the original cyphertext message also and to calculate its own "part" plaintext message $x_2 = y^{d_2}$ mod N. B may then be programmed to reproduce the original plaintext message $x = x_1 x_2$ mod N which may be output to a display device or to a storage device for later viewing.

Figure 4:
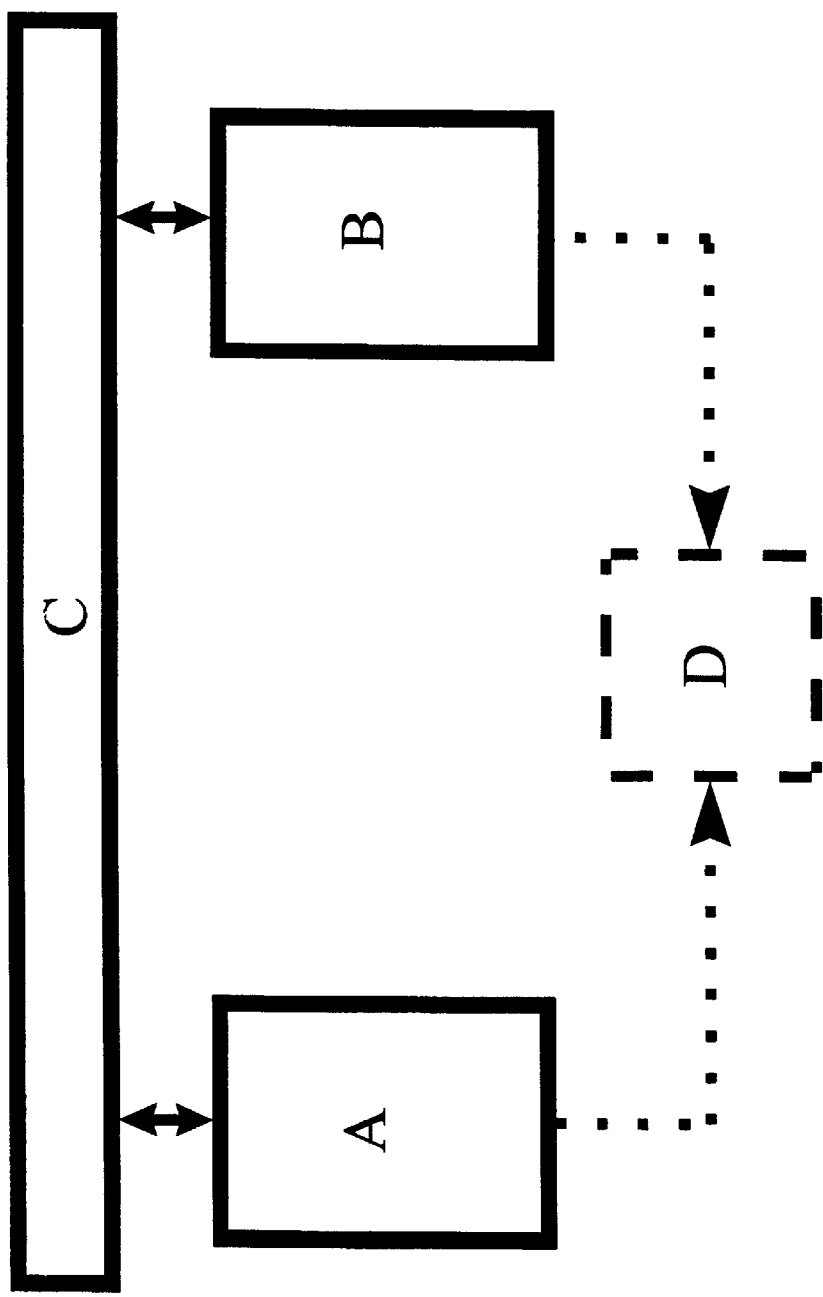
FIG. 4 shows a schematic representation of a split-key cryptographic system according to the present invention, operable in accordance with the sequences of FIG. 1.

Referring now to FIG. 4, two co-operating entities, shown as computers A and B, are linked via a conventional unsecured communications channel C, for example an internet connection, which they are programmed to use in order to transmit data between themselves. In this example this communications channel C is also accessible to one or more encryption computers (not shown) which can access the public RSA parameters and supply a suitably encrypted cyphertext message to either or both computers A and B.

In operation computer A is programmed to generate two numbers $p_1$ and $q_1$ (not necessarily prime) and computer B is programmed to generate two numbers $p_2$ and $q_2$. Co-operative exchange of data between A and B allows the generation of the public modulus N=PQ, where $P=p_1+p_2$ and $Q=q_1+q_2$ and $x^{(N+1)} \equiv x^{P+Q}$ mod (N) in such a way that neither A nor B alone has access to both P and Q. In this example the public encryption key, e, is generated by A but a person skilled in the art would appreciate that as knowledge of this key would not in itself compromise security the only requirement is that this key is made known to computers A and B. The numbers N and e can then be made publicly available for encrypting a plaintext message using the RSA algorithim using the communication channel C. The cyphertext message is then passed to A and B for co-operative decryption. Employing the method outlined above with, reference to FIG. 3, computer A is programmed to provide a partly decrypted message to computer B which is itself programmed to generate its own partly decrypted message. Computer B is also programmed to combine the two partly decrypted messages to provide a plaintext output, for example on a computer screen or on a computer data storage device.

Alternatively, it may be desirable that neither computer A nor computer B can reproduce the original plaintext message. In this circumstance the cryptographic system may additionally comprise a third, decryption computer, D (shown as a broken box in FIG. 4). The cyphertext message y is received from the communication channel C by A and B. These two computers are programmed to calculate their respective "part" plaintext messages $x_1$ mod N and $x_2$ mod N respectively which are transmitted to D, preferably using a secure communications channel. Thus D can be programmed to determine $x=x_1 x_2$ mod N.

EXAMPLE 2

Figure 1:
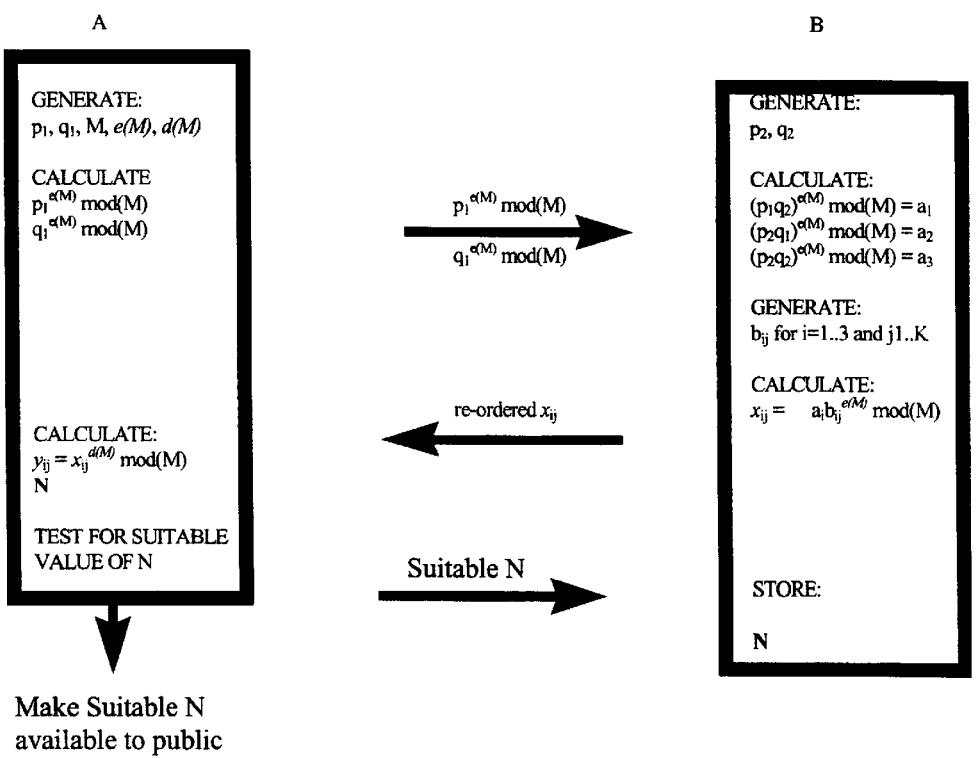
FIG. 1 shows the sequence, in principle, of operating a cryptographic system according to the present invention to generate the public parameter, N.

This example describes the use of the system shown in FIG. 4 and the method described in conjunction with FIG. 1 to implement the well known Fiat Shamir scheme ["How to Prove Yourself: Practical solutions to Identification and Signature Problems", Advances in Cryptology-Crypto '86 Lecture Notes in Computer Science Vol 263, pp186–194]. In this case, where A and B will essentially substitute for "the single trusted centre", a third computer D will need to present values $v_j$ derived via its personal identity and a universal hash function, and obtain data that will allow D's calculations of $s_j$ where $s_j^2 = v_j$ mod N whenever $v_j$ has a square root. The public modulus N may be determined by A and B according to the method provided at step a. of Example 1.

To implement the scheme by utilising the method and system according to the present invention, suitable programming must be made to ensure that P≡3 (mod 4) and Q≡3 (mod 4), and note that if d=((P−1)(Q−1)+4)/8, then whenever $v_j$ is a square modulo N d then $s_j = v_j^d$ mod N is a square root of $v_j$. The secret decryption key, being the exponent, d will be held in two parts $d_1$ and $d_2$ by A and B respectively. In this case.

for A:

$$d_1=((N+5)/2-p_1-q_1)/8$$

for B:

$$d_2=((N+5)/2-p_2-q_2))/8$$

(As in Example 1 the rounding of the two parts of the decryption key may be reversed)

Then if presented with a value of $v_j$, A and B must check that the Jacobi symbol ($v_j$/N) equals 1. If so A will calculate $w_{j,1}=v_j^{d1}$ mod N and B will calculate $w_{j,2}=v_j^{d2}$ mod N. D will calculate $w_j=w_{j,1} w_{j,2}$ mod N, which will either be the square root of $v_j$ mod N, or will be the square root of N−$v_j$ mod N. In the latter case D will reject this particular $v_j$.

EXAMPLE 3

This example describes the extension of the method described in example 1 to allow an arbitary number of parties to co-operate in generating the parameters for an RSA encryption system to allow the parties to decode a cyphertext message to reproduce the plaintext message. The method consists in essence of the three parts a, b and c described in the previous example, generalised for an arbitary number of parties.

<u>a</u>. Initially each party or entity i produces their own RSA modulus $M_i$ and public key $e_i$. These two numbers are broadcast to the other parties. The modulus $M_i$ should be at least as big as n times $N_L$, the largest possible value of the public modulus N that may be produced, where $N=(p_1+p_2+\ldots+p_n)(q_1+q_2+\ldots+q_n)$. Then each party i broadcasts to the other parties the quantities $p_i^{ei}$ mod $M_i$ and $q_i^{ei}$ mod $M_i$.

Each party i also produces a set of additives $a_{ij}$, for j=1, 2, ..., n, where the $a_{ij}$ are randomly chosen in the range $0<a_{ij}<N_L$, unless i=j. These numbers must satisfy the equation $\Sigma_j a_{ij}=0$. Thus $a_{ii}$ will be negative.

Each party i now calculates, for sending to the other parties j, the three numbers $(p_i q_j)^{ej}$ mod $M_j$, $(p_j q_i)^{ej}$ mod $M_j$ and $a_{ij}^{ej}$ mod $M_j$. As in example 1, these three quantities will be referred to as $z_1$, $z_2$ and $z_3$ respectively. However, before sending these numbers to j, each is split into K parts using the same technique as described in example 1. In detail, suppose that X is one of the numbers to be sent. Then party i generates K numbers $x_k$, randomly chosen modulo $M_j$ such that $\Sigma_k x_k = 1$ mod $M_j$. Then the K parts that i sends to j are X $x_k^{ej}$ mod $M_j$. The 3K values are sent in a new order such that j does not know which parts corresponds to each of the three numbers that i is sending. The security of the scheme depends on making K large enough and the same considerations apply as in example 1.

By decrypting and summing the RSA encrypted data sent to him, each party i will have received enough information to enable him to calculate: $\Sigma_{i \neq j} p_i q_j + \Sigma_{i \neq j} p_j q_i + \Sigma_{i \neq j} a_{ji}$ mod $M_i$. But because $M_i$ was chosen to be sufficiently large, this must equal: $\Sigma_{i \neq j} p_i q_j + \Sigma_{i \neq j} p_j q_i + \Sigma_{i \neq j} a_{ji}$. Hence by adding in terms that he knows himself, party i can calculate: $N_i = \Sigma_j p_i q_j + \Sigma_j p_j q_i + \Sigma_j a_{ji}$.

Note, that this sum includes all the diagonal terms $p_i q_i$ and $a_{ii}$.

By sharing $N_i$, all parties will be able to determine the sum of these quantities: $\Sigma_i N_i = 2(p_1+p_2+\ldots+p_n)(q_1+q_2+\ldots+q_n)$. Alternatively, by sharing only $N_i$ mod M, for some commonly agreed odd modulus M, the participants will be able to determine N mod M.

As in example 1, there is no particular reason to expect that $P=(p_1+p_2+\ldots+p_n)$ and $Q=(q_1+q_2+\ldots+q_n)$ are both prime, and so many candidate N will need to be tested until one is found that is satisfactory. Initial testing is done by selecting random values x, and having each party calculate $x^{pi+qi}$ mod N. Then, if N is the product of two primes, the product of all these numbers will equal $x^{N+1-}$ mod N.

There is still the requirement to eliminate Carmichael numbers which the above test will pass. The Boneh and Franklin test, described in example 1, can be readily extended to the multiple party situation of the present example. To use this test it is necessary that P and Q are congruent to 3 modulo 4, and thus the participants will have to decide in advance on the values of $p_i$ and $q_i$ modulo 4, for every i.

The process of generating a suitable N is made more efficient if the numbers $p_i$ and $q_i$ are controlled to ensure that neither P nor Q is a multiple of the first few primes. This can be done in much the same way as proposed in example 1, either by agreeing on the value of $p_i$ and $q_i$ modulo p for primes p<n, or by making $p_i$ and $q_i$ less than [n/p] for small primes p larger than n.

<u>b.</u> Once an acceptable modulus has been found, the next step is to generate the public encryption key, e and the secret decryption key d. This is done in such a way that d is held by the co-operating parties i in n parts, where $d=(d_1+d_2+\ldots d_n)+c$. The algorithm employed to generate these parameters is as follows:

Firstly, the public key e is agreed. All parties will need to share $p_i+q_i$ mod e, so e should not be too large. Also, P−1 and Q−1 have to be coprime to e and if they are not then N has to be rejected or a different value of e must be selected. The decryption key will satisfy:

$$ed=1 \bmod(N+1-P-Q)$$

Thus, $ed \equiv 1+k(N+1-(p_1+p_2+\ldots+p_n)-(q_1+q_2+\ldots+q_n))$, where k is chosen to make the right hand side a multiple of e, allowing k to be determined by all parties from the shared values of $p_i$ and $q_i$ modulo e.

The individual decryption key, known only by participant i, $d_i$ say, is then determined by:

$$d_i = \frac{\lfloor (1/n) + (k/n)(N+1) - kp_i - kq_i \rfloor}{e}$$

Hence the decryption key d will satisfy $d=(d_1+d_2+\ldots+d_n)+c$, where c will lie between 0 and n−1. One trial decryption will be sufficient to identify c, and all parties may know c.

<u>c.</u> In order to decrypt an RSA encrypted, cyphertext message y, participant i will calculate $y^{di}$ mod N, and the decrypted, plaintext message will be the product of these n terms together with $y^c$ mod N.

A person skilled in the art will easily be able to adapt the system configuration shown in FIG. 4 and the associated description provided in example 1, to provide a system in which a plurality of co-operating entities, for example computers, linked via an unsecured communications channel, can exchange encrypted data using the method outlined in this example.

EXAMPLE 4

The multi party method described in example 3 can also be used to enable arbitary encryption keys to be used. The inventor achieves this by following the method of Boneh and Franklin, substituting the principles described in example 3 for their BGW protocol. The method is described below, where e is the encryption key. In the following, assume that e is large (of the same order as the modulus N) and in this case the moduli $M_i$ used in the method according to the invention will need to be at least $nN^2$ in size.

Define $\phi_1=(N+1)-p_1-q_1$ mod e and $\phi_i=-p_i-q_i$ mod e, for i>1, which is computable by party i.

Each participant i generates an arbitrary value mod e, $r_i$ say. Then they execute the method described in example 3, with party i using $r_i$ and $\phi_i$ as input values, $p_i$ and $q_i$. They share their recoveries modulo e, so that they can all determine:

$$\Psi=(\Sigma_i r_i)(\Sigma_i \phi_i) \bmod e$$

If $\Psi=0$, they restart with new values of $r_i$. If this fails repeatedly then they will need to either choose a different modulus N or a different exponent e.

Each party i now calculates $\zeta_i=-r_i/\Psi$ mod e. Thus:

$$\Sigma_i \zeta_i = -(\Sigma_i r_i)\Psi^{-1} = -(\Sigma_i \phi_i)^{-1} \bmod e$$

Finally the parties use the method described in example 3, with inputs $\zeta_i$, $\phi_i$ as $p_i$ and $q_i$ respectively. If the output recovered by party i is $\eta_i$, then:

$$\Sigma_i \eta_i = (\Sigma_i \zeta_i)(\Sigma_i \phi_i) \equiv -1 \bmod e$$

Thus the decription key, $$d = \frac{1 + \sum_i \eta_i}{e}.$$

The individual decryption key, $d_i$, known only by participant i, is given by:

$$d_i = \frac{\lfloor \eta_i \rfloor}{e}$$

Hence the decryption key d will satisfy $d=(d_1+d_2+\ldots d_n)+c$, where c lies between 0 and n−1. One trial decryption will be sufficient to identify c. Thus as in the small exponent case, in order to decrypt an RSA encrypted, cyphertext message y, participant i will calculate $y^{di}$ mod N, and the decrypted, plaintext message will be the product of these n terms together with $y^c$ mod N.

It is possible to use the approach outlined above, even if the encryption key, e, is much smaller than the generated modulus N. However, a change to the method is required in order to retain security. Before using $r_i$, $\phi_i$ and $\zeta_i$ in the method described in example 3, the parties should add to them random multiples of e to bring the sum up to a limit L. The moduli $M_i$ must be at least $nL^2$ in size. A value of L=N is recommended.

In any use of the method and system according to the present invention a critical security question is the size of K, the number of fragments into which <u>a</u> party splits each of the three quantities $z_1$, $z_2$ and $z_3$ and although in theory K may be different for each of these three quantities the overall security of the system will be dependent on the smallest value of K used. Thus practically it reduces computational expenditure to choose the same K values for each of the three quantities.

Considering the case where two entities A and B are co-operating, by way of example, A receives (encrypted under its modulus) $p_1q_2b_{1,j}$, $p_2q_1b_{2,j}$ and $p_2q_2b_{3,j}$. A can then be programmed to recover the factorisation of N if it can identify which fragment is associated with each of the three quantities $p_1q_2$, $p_2q_1$ and $p_2q_2$.

However, by selecting a value of K so that the total number of possible arrangements $(3K)!/(K!)^3$ exceeds $M^2$ then for most guesses by A as to the value of $p_1q_2$, $p_2q_1$ and $p_2q_2$ (subject to their sum being the value recovered) it will be ensured that there will be a partition of the 3K fragments into 3 sets which produce these three values. In other words, A gains negligible additional information about the values of $p_1q_2$, $p_2q_1$ and $p_2q_2$ from the fact that they can be obtained from a partition of the 3K pieces. If M is 512 bits in size then K will need to be at least 218 to achieve this bound. In practice it is likely that a smaller value of K will provided adequate security.

Finally, assuming that A's public encryption exponent e(M) is small, the principal amount of work is performed by A, which calculates 3K decryptions for each trial N. As the probability that N is a product of two primes is about the total amount of work A will expect to have to do amounts to $0.75K(\log N)^2$ decryptions. Assuming that P and Q are of similar size. For numbers of size 512 bits, with K equal to 218, this is about 20.6 million decryptions. Clearly it is desirable to cut this down if at all possible. One way to do this is to increase the probability that P and Q will be prime. This can be achieved by taking a set of small primes: 3,5, 7, . . . ,R say and agreeing that both A and B will choose $p_i$ mod S and $q_i$ mod S to be less than (S/2) for each prime S in this range, and also agree that only one of them can choose numbers that are a multiple of S. For the prime 2, they must be programmed such that it is known which will select a multiple of 2 and which will choose an odd number. (If they are going to use the Boneh and Franklin test then they will control the values of $p_i$ and $q_i$ modulo 4 as well).

Each small prime places 1 bit of constraint for A and B on the choice of $p_i$ and $q_i$, but significantly reduces the number of candidate moduli N that need to be tested. An alternative would be to use zero knowledge methods to ensure that $p_1$ mod S≠–$p_2$ mod S and that $q_1$ mod S≠$q_2$ mod S, but this will not be necessary if the number of primes to be controlled is small. For example, if the first 10 primes are controlled so that R=29, the number of decryptions A makes drops by a factor of 40 to around 514000. Using the first 20 primes drops the expected number to around 336000. Although large, this is quite practical for generating long term system wide RSA parameters. For example, for a 512 bit modulus the calculations would take a little over one day to complete using MATHEMATICA™ on a SPARC10™ workstation.

It will be obvious to those skilled in the art that the transfer of information between the microprocessors A and B, or between the multiple parties i, may be done using the publicly accessible communication channel C or may be made via separate dedicated communications channels.

What is claimed is:

1. A method of operating a split-key cryptographic system having a plurality of co-operating microprocessors, i, linked via a communications channel, involving the generation of a public modulus, N, being the multiple of two integers, P,Q, where P=($p_1+p_2 \ldots p_n$) and Q=($q_1+q_2+ \ldots q_n$) characterized by the following steps:
   i) having each microprocessor, i, select integers $p_i$, $q_i$
   ii) having each microprocessor, i, determine a public modulus, $M_i$, public key $e_i$ and private key $d_i$ such that $d_i \, e_i \equiv 1$ mod $\Phi$ ($M_i$);
   iii) having each microprocessor, i, generate the quantities $p_i^{ei}$ mod $M_i$ and $q_i^{ei}$ mod $M_i$ and transmitting them to the other microprocessor or microprocessors, j, via the communications channel;
   iv) having each microprocessor i generate three numbers, $z_1,z_2,z_3$, which are respectively $(p_iq_j)^{ej}$ mod $M_j$, $(p_jq_i)^{ej}$ mod $M_j$ and $a_{i,j}^{ej}$ mod $M_j$, with $a_{i,j}$, for i≠j chosen to be random between 0 and the maximum desired public modulus N, subject to the constraint $\Sigma_j a_{i,j}=0$, and generate a set of numbers, $b_{l,k}$ for l=1, 2, 3 and k=1, 2, . . . , K with $b_{l,k}$ being chosen to be random modulo $M_j$, subject to the constraints: $\Sigma_k b_{1,k} := \Sigma_k b_{2,k} = \Sigma_k b_{3,k} = 1$ Mod $M_j$, having microprocessor i generate a set of numbers, $x_{l,k}=z_l b_{l,k}^{e(M)}$ mod $M_j$ and transmitting this set of numbers to each microprocessors j in a new order determined by microprocessor i;
   v) having microprocessor i calculate $y_{jl,k}=x_{l,k}^{di}$ mod $M_i$, for each term $x_{l,k}$ received from each other microprocessor j, and the public modulus $N_i=\Sigma_{j,l,k} y_{j,l,k}+2p_i q_i+a_{ii}$;
   vi) having each microprocessor i broadcast $N_i$ to each of the other microprocessors, j and having all microprocessors calculate $2N=\Sigma_i N_i$
   vii) testing that N is of a suitable form for use as an RSA modulus and repeating steps i) to vi) with a new set of integer values at step i) if test failed.

2. A method of operating a split-key cryptographic system as claimed in claim 1, having two co-operating microprocessors, wherein by prior agreement $a_{2,1}$ is selected to equal $p_2 q_2$ such that microprocessor 2 does not need to carry out step iii), microprocessor 1 does not need to carry out step iv) and microprocessor 1 can calculate directly the public modulus N=$p_1 q_1 + \Sigma_{l,k} y_{2,l,k}$ mod $M_1$.

3. A method of operating a split-key cryptographic system as claimed in claim 2 characterized in that steps ii)–vi) are repeated substituting microprocessor 2 for microprocessor 1 and vice versa in the steps and using the same values $p_1,p_2$, $q_1$, $q_2$ but changing the subscripts according to the substitution and in that microprocessor 1 and microprocessor 2 are further programmed to confirm the generation of identical values of N before N is made available to one or more further microprocessors.

4. A method of operating a split-key cryptographic system as claimed in claim 1, characterized in that there is provided a further step of having the microprocessors i co-operate to test the likelihood, to a predetermined level, of P and Q being prime and rejecting values of N not being the product of two prime numbers to that level of likelihood.

5. A method of operating a split-key cryptographic system as claimed in claim 1 to provide a plaintext message, x, from an RSA ciphertext message y, characterized in that there is provided further steps:
   viii) ensuring the microprocessors i receive parameters N and a public encryption key, e;
   ix) having each microprocessor i generate the value $(p_i+q_i)$ mod e and transmit it to each microprocessor j,
   x) having all microprocessors calculate the values f=P+Q–N–1 (mod e) and k=$f^{-1}$ mod(e);
   xi) having each microprocessor i calculate $$di = \frac{\lfloor (1/n) + (k/n)(N+1) - kp_i kq_i \rfloor}{e}$$

xii) involving each microprocessor i to produce a partly decrypted a ciphertext message, $x_i$, from a plain text message y enciphered using a formula of the form y=$x^e$ mod N according to a formula of the form $x_i=y^{di}$ mod N;
   xiii) producing and outputting the plaintext message x=$\eta_i y^{di}$ mod N·$y^c$ mod N, where c lies between 0 and n–1 and is known by all microprocessors.

6. A split-key encryption system comprising a communications channel accessible by an encryption microprocessor and a plurality of decryption microprocessors operably coupled to exchange data and operably connectable to the communications channel characterized in that the decryption microprocessors are programmed to co-operate in the generation of a public modulus N according to the method claimed in claim 1.

7. A split-key encryption system as characterized in that the plurality of decryption microprocessors are further programmed to operate according to the method of claim 5.

8. A split-key encryption system as claimed in claim 7 characterized in that there is additionally provided a third microprocessor operably connectable to the decryption microprocessors and configured to receive and decrypt to plaintext a plurality of partly decrypted ciphertext messages output from the corresponding decryption microprocessors.

9. A split-key encryption system as claimed in claim 6 characterized in that the microprocessors are incorporated into at least one suitably programmed computer.

* * * * *